UNITED STATES PATENT OFFICE.

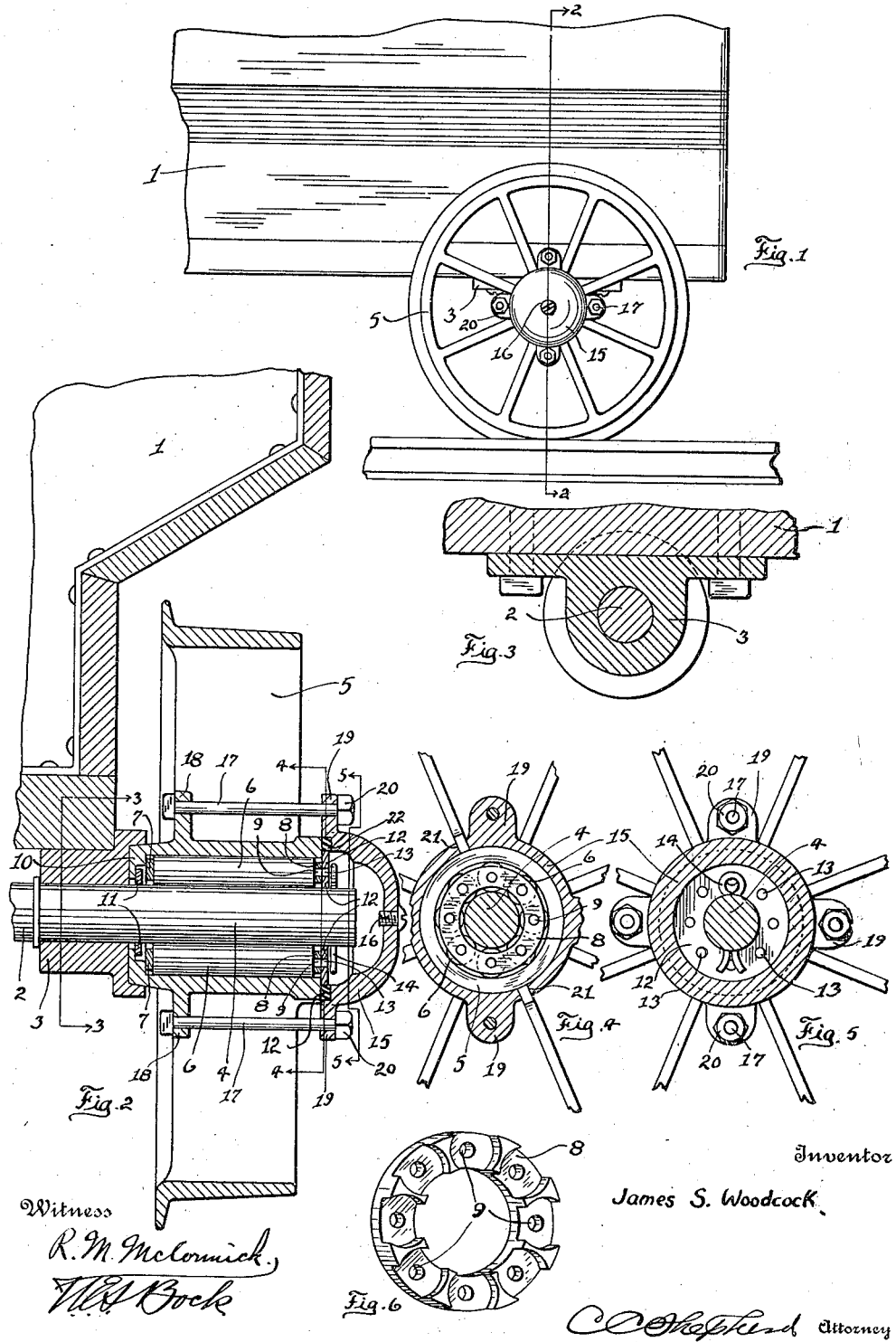

JAMES S. WOODCOCK, OF NEW LEXINGTON, OHIO.

CAR-WHEEL CONSTRUCTION.

1,310,227.   Specification of Letters Patent.   Patented July 15, 1919.

Application filed July 26, 1916.  Serial No. 111,357.

*To all whom it may concern:*

Be it known that I, JAMES S. WOODCOCK, a citizen of the United States, residing at New Lexington, in the county of Perry and State of Ohio, have invented certain new and useful Improvements in Car-Wheel Constructions, of which the following is a specification.

This invention relates to car wheel construction and aims particularly to provide means whereby a lubricant such as grease or heavy oil may be held confined within the wheel to supply the necessary lubrication during transportation or in which the oil or grease may be supplied without necessarily removing the wheel from its operative position. By my arrangement, a car wheel may be maintained in a properly lubricated state for a year or more without attention. In addition to this low operating cost, the structure may be produced at a minimum expense.

The preferred embodiment of my invention is shown in the accompanying sheet of drawings, in which similar characters of reference designate corresponding parts, and in which:

Figure 1 is a side elevation of a portion of a mine car with my invention applied thereto, Fig. 2 is a cross section taken on line 2—2 of Fig. 1, Fig. 3 is a section taken on line 3—3 of Fig. 2, Fig. 4 is a section taken on line 4—4 of Fig. 2, Fig. 5 is a section taken on line 5—5 of Fig. 2, and, Fig. 6 is a view in perspective of a portion of the roller bearing used within the car wheel itself.

In the drawing, the invention has been shown as being applied to a mine car, the body of which has been designated by the reference numeral 1 and the axle by the reference numeral 2. This axle is suitably supported within support bearings 3 rigidly secured to the underside of the car in such relation that the portions 4 project to receive the car wheels 5. These wheels are bored to a size to create an oil or grease chamber in connection with parts to be presently described and in addition to fit the roller bearings designated by the reference numerals 6, which bearings are formed of a plurality of rollers suitably held between two end frames 7 and 8 respectively. These end frames are socketed as is shown in Fig. 6 and in addition, the end frame 8 is provided with a circular array of apertures 9 through which the lubricant may pass to have ready access to the rollers themselves. The rear side of the wheel hub is provided with an annular flange 10 against which the end frame 7 rests. However, this flange is counterbored, as is shown, to receive the washer 11, which washer fits or passes over the end of the axle or spindle closely to prevent the lubricant from seeping through and in so doing virtually forms one end closure for the oil or grease chamber in which the other roller bearings work. In addition, this washer is of less thickness than the depth of the counterbore, so that it will be allowed a certain amount of movement between the flange 10 and the end frame 7, but will be held against this flange when the chamber contains the lubricant. This washer also is intended to act as a valve during the act of inserting grease, the pressure from the grease gun forcing the washer against the annular flange 10 to make it function as a clapper or check valve. Resting against the forward face of the wheel hub and also against the end frame 8 of the roller bearings, is a washer 12 provided with a circular array of apertures 13 designed to register with the apertures 9 in the end frame. A cotter pin 14 is inserted through the extreme outer end of the axle to prevent removal of the wheel, after it has been applied. After the wheel has been thus assembled, a cap member 15 is applied, this cap being dished as is shown and being centrally apertured to receive the removable plug 16. This cap is held in rigid and sealed engagement with the wheel hub by means of the gasket 22 disposed against the front hub face slightly above the washer 12 and the bolts shown at 17, which bolts pass through radially projecting pierced ears 18 carried by the wheel itself and similarly formed pierced ears 19 carried by the cap. When the nuts 20 are drawn tight, the cap 15 is pulled tightly against the gasket 22 and the face of the wheel hub with the washer 12 between it and the wheel hub and grease or heavy oil may then be supplied to the bearing portions by insertion through the threaded aperture, after the plug 16 has been removed. When the space or chamber surrounding the bearings and the space created by the cap is completely filled, the plug may be replaced and in this manner the lubricant will be held confined within the wheel hub. In order to prevent the relative rotation between the cap 15 and the wheel, I have provided the cap with a pair of notched-out portions shown at 21 in Fig. 4, which notched-out portions are designed to coöperate with complemental raised portions on the spokes of the wheel. When the cap is thus applied, it will be impossible for it to rotate with respect to the wheel and in this manner the bolts 17 are relieved of unnatural strain.

What I claim, is:

1. The combination with a car wheel and radially projecting ears carried by said wheel, of an axle therefor, an anti-friction bearing within said wheel, an apertured dished cap for the wheel hub to cover same, radially projecting ears carried by said cap, bolts passing through said ears for securing said cap to the wheel, and a removable plug for the aperture in said cap, said wheel and said cap carrying means for locking the cap against relative rotative movement with respect to the wheel.

2. The combination with a car wheel and a circular flange on the rear of the wheel hub, of an axle therefor, an anti-friction bearing formed of a pair of end frames with a plurality of rollers between them, the front one of said frames having a plurality of transverse apertures, a clapper or washer closely fitting said axle between said flange and the rear one of said end frames, a cap for sealing the front end of said wheel hub, and a washer resting between said cap and said wheel hub, said washer having a plurality of transverse apertures coöperating with said first named transverse apertures.

In testimony whereof I affix my signature in presence of two witnesses.

J. S. WOODCOCK.

Witnesses:
 WALTER E. L. BOCK,
 RUSSEL M. McCORMICK.

Copies of this patent may be obtained for five cents each, by addressing the "Commissioner of Patents, Washington, D. C."